US012744609B2

(12) United States Patent
Yu et al.

(10) Patent No.: US 12,744,609 B2
(45) Date of Patent: Sep. 22, 2026

(54) RADIO APPARATUS FOR A VEHICLE AND A CONTROL METHOD THEREOF

(71) Applicants: HYUNDAI MOTOR COMPANY, Seoul (KR); KIA CORPORATION, Seoul (KR)

(72) Inventors: Jae Kyu Yu, Hwaseong-si (KR); Oh Yun Kwon, Hwaseong-si (KR); Ji Hun Lim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 148 days.

(21) Appl. No.: 18/912,981

(22) Filed: Oct. 11, 2024

(65) Prior Publication Data

US 2025/0379674 A1 Dec. 11, 2025

(30) Foreign Application Priority Data

Jun. 5, 2024 (KR) ........................ 10-2024-0073505

(51) Int. Cl.
*H04H 40/72* (2008.01)
*H04H 40/63* (2008.01)

(52) U.S. Cl.
CPC ............ *H04H 40/72* (2013.01); *H04H 40/63* (2013.01); *H04H 2201/13* (2013.01)

(58) Field of Classification Search
CPC .... H04H 40/72; H04H 40/63; H04H 2201/13; H04H 20/22; H04H 20/24; H04H 20/26; H04H 20/57; H04H 60/44; H04H 60/48; H04H 2201/11; H04H 2201/12; H04B 1/3822
USPC .................................... 381/13, 1, 2, 3, 4, 15
See application file for complete search history.

(56) References Cited

U.S. PATENT DOCUMENTS

| | | | | |
|---|---|---|---|---|
| 6,711,390 | B1 * | 3/2004 | Moers | H03J 1/0083 455/45 |
| 7,791,537 | B2 * | 9/2010 | Natsume | G01S 5/04 342/417 |
| 7,916,872 | B1 * | 3/2011 | Harris | H04H 20/33 381/2 |
| 2009/0131003 | A1 * | 5/2009 | Masamoto | H04H 20/08 455/186.1 |
| 2013/0210398 | A1 * | 8/2013 | Roussel | H04L 67/60 455/414.2 |
| 2017/0032402 | A1 * | 2/2017 | Patsiokas | G06Q 30/0207 |
| 2017/0331554 | A1 * | 11/2017 | Ke | H04J 14/0232 |
| 2019/0306557 | A1 * | 10/2019 | Miller | H04H 20/24 |

* cited by examiner

*Primary Examiner* — Vivian C Chin
*Assistant Examiner* — Con P Tran
(74) *Attorney, Agent, or Firm* — Lempia Summerfield Katz LLC

(57) ABSTRACT

A radio apparatus for a vehicle and a control method thereof. An aspect of the present disclosure provides a method of controlling a vehicle radio apparatus, the method comprising: checking a program title of a program of Internet radio being listened to; searching for a frequency of a first analog radio with the program title, the first analog radio being a radio broadcast transmitted by a radio station; checking an electric field strength of the first analog radio at the frequency; modulating the Internet radio to a second analog radio when the electric field strength is less than a threshold; and transmitting the second analog radio.

14 Claims, 8 Drawing Sheets

RADIO APPARATUS FOR A VEHICLE AND A CONTROL METHOD THEREOF

CROSS-REFERENCE TO RELATED APPLICATION

This application claims the benefit of and priority to Korean Patent Application No. 10-2024-0073505, filed on Jun. 5, 2024, the entire contents of which are hereby incorporated herein by reference.

TECHNICAL FIELD

The present disclosure relates to a radio apparatus for a vehicle and a control method thereof.

BACKGROUND

The content described in this section merely provides background information related to one embodiment of the present disclosure and does not constitute prior art.

A vehicle may be equipped with a radio and Digital Multimedia Broadcasting (DMB). Vehicle occupants can use the radio and DMB to listen to Amplitude Modulation (AM)/Frequency Modulation (FM) radio or DMB radio broadcasts.

The types of radio may include: i) analog radio such as AM radio and FM radio, ii) digital radio such as Digital Audio Broadcasting (DAB) and Digital Radio Mondale (DRM), and iii) Internet radio delivered through the Internet protocol.

The analog radio method has a problem in that as the vehicle moves away from the transmitter of the broadcast being listened to, the received signal becomes weaker and the broadcasting condition deteriorates. For example, in places such as underpasses, underground parking lots, and tunnels, it is difficult for radio waves to reach the antenna attached to the vehicle, resulting in low reception rates.

The Internet radio method is similar to the analog radio method in that it is difficult for radio waves to reach vehicles or in-vehicle terminals, but the reception rate is generally higher than analog radio since facilities such as base stations and repeaters are built more densely than radio.

Telematics technology, which combines automobile and wireless communication technology, is gaining attention. Telematics technology is applied to various functions such as navigation, information search, in-vehicle environment settings, and autonomous driving, allowing vehicle drivers and passengers to travel comfortably.

In a connected car that can access wireless communication, for example, an Internet radio accessible vehicle, it is possible to listen to radio broadcasts through Internet radio regardless of the analog radio reception quality. Therefore, in the case of an Internet radio accessible vehicle, a desired broadcast can be easily listened to through Internet radio even when analog radio reception quality is poor.

Therefore, there is a need for technology that in vehicles that can receive only analog radio, e.g., Internet radio inaccessible vehicles, enables easy listening to radio broadcasts, even when the reception quality of the analog radio broadcasted by the radio station is poor.

SUMMARY

An object of the present disclosure is to provide a radio apparatus for a vehicle and a control method thereof that enable easy listening to radio broadcasts in an Internet radio inaccessible vehicle even when the reception quality of analog radio broadcasted by a radio station is poor. Specifically, an embodiment of the present disclosure provides a radio apparatus for a vehicle and a control method thereof that enable easy listening to radio broadcasts in an Internet radio inaccessible vehicle by, when an Internet radio accessible vehicle is adjacent to the Internet radio inaccessible vehicle, modulating the Internet radio being received by the Internet radio accessible vehicle to analog radio, transmitting the analog radio to the Internet radio inaccessible vehicle, and allowing the Internet radio inaccessible vehicle to receive the analog radio transmitted from the Internet radio accessible vehicle.

The technical objects of the present disclosure are not limited to those described above. Other technical objects not mentioned above should be more clearly understood by those having ordinary skill in the art from the following description.

An embodiment of the present disclosure provides a method of controlling a vehicle radio apparatus, the method comprising: checking a program title of a program of Internet radio being listened to; searching for a frequency of a first analog radio with the program title, the first analog radio being a radio broadcast transmitted by a radio station; checking an electric field strength of the first analog radio at the frequency; modulating the Internet radio to a second analog radio when the electric field strength is less than a threshold; and transmitting the second analog radio.

Another embodiment of the present disclosure provides a method of controlling a vehicle radio apparatus, the method comprising: receiving a second analog radio; demodulating the second analog radio to an original radio; and playing the original radio using an in-vehicle output device, wherein the second analog radio is a signal generated by a surrounding vehicle by checking a program title of a program of Internet radio being listened to, searching for a frequency of a first analog radio with the program title, the first analog radio being a radio broadcast transmitted by a radio station, checking an electric field strength of the first analog radio at the frequency, and modulating the Internet radio to a second analog radio when the electric field strength is less than a threshold, wherein the original radio is the same signal as the Internet radio.

According to embodiments of the present disclosure, an Internet radio inaccessible vehicle can easily play radio broadcasts by receiving analog radio transmitted from a neighboring Internet radio accessible vehicle, even when the reception quality of analog radio broadcasted by a radio station is poor.

The technical effects of the present disclosure are not limited to the technical effects described above. Other technical effects not mentioned herein may be more clearly understood by those having ordinary skill in the art to which the present disclosure pertains from the description below.

BRIEF DESCRIPTION OF THE DRAWINGS

The same reference numerals may be used throughout the drawings to refer to the same or similar components.

DETAILED DESCRIPTION

Figure 1:
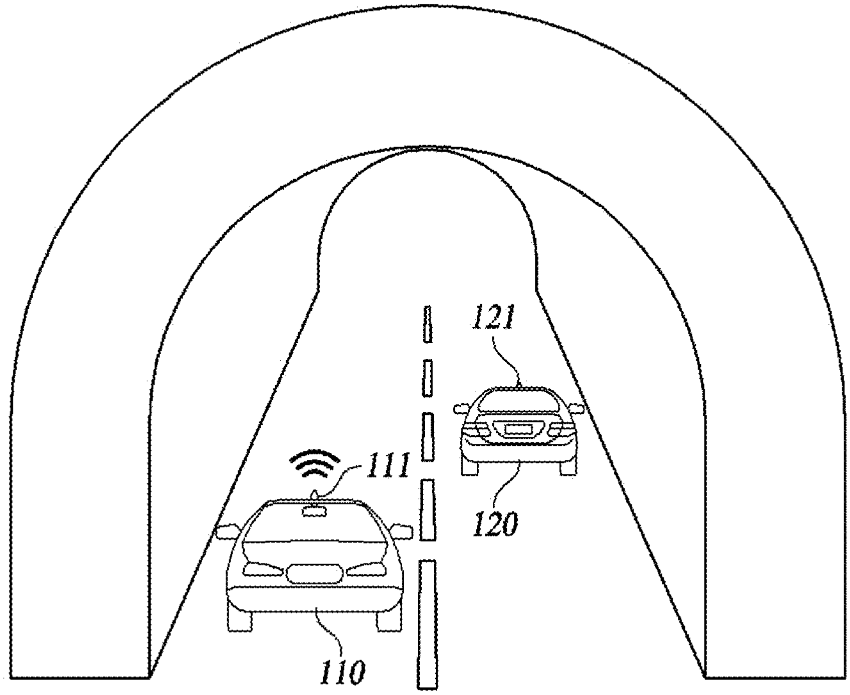
FIG. 1 is a diagram illustrating an example of an Internet radio accessible vehicle transmitting analog radio to an Internet radio inaccessible vehicle, according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a diagram illustrating an example of an Internet radio accessible vehicle transmitting analog radio to an Internet radio inaccessible vehicle, according to one embodiment of the present disclosure.

An Internet radio accessible vehicle 110 may transmit analog radio to an Internet radio inaccessible vehicle 120. The Internet radio inaccessible vehicle 120 may receive the analog radio transmitted from the vehicle 110. The vehicles 110 and 12 may be adjacent to each other.

Transmission and reception of analog radio may be performed via antennas 111 and 121 provided in the respective vehicles. The antennas 111 and 121 may be rod-shaped antennas, glass antennas, or shark fin antennas. The antennas 111 and 121 may be included in a transmitter and a receiver.

Figure 2:
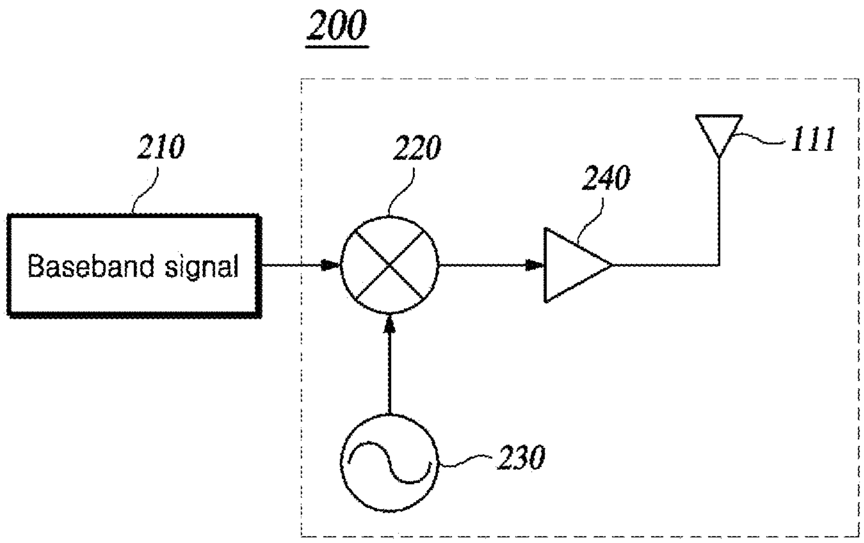
FIG. 2 is a diagram for explaining the structure of a transmitter according to one embodiment of the present disclosure.
Figure 3:
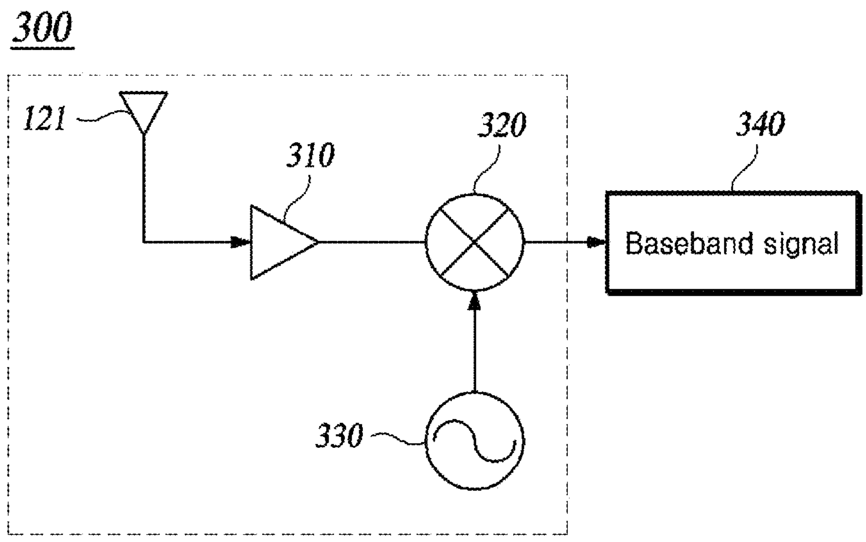
FIG. 3 is a diagram for explaining the structure of a receiver according to one embodiment of the present disclosure.

FIG. 2 is a diagram for explaining the structure of a transmitter according to one embodiment of the present disclosure. FIG. 3 is a diagram for explaining the structure of a receiver according to one embodiment of the present disclosure.

Referring to FIG. 2, a transmitter 200 includes a mixer 220, an oscillator 230, an amplifier 240, and an antenna (e.g., the antenna 111).

The transmitter 200 may be mounted on an Internet radio accessible vehicle 110.

The Internet radio accessible vehicle 110 receives Internet radio, i.e., a baseband signal 210. The baseband signal is a signal that contains information that a sender wants to convey to a receiver in communications. The baseband signal may be voice, video, image, or data.

The Internet radio accessible vehicle 110 modulates the baseband signal 210 using the mixer 220. In the modulation process, a signal generated by the oscillator 230 may be used. Modulation methods may include amplitude modulation (AM) and frequency modulation (FM).

The Internet radio accessible vehicle 110 amplifies the modulated signal (not shown) using the amplifier 240. The Internet radio accessible vehicle 110 transmits the amplified signal (not shown) using the antenna 111. In an example, the antenna 111 radiates an electric signal as an electromagnetic wave (not shown).

Since FIG. 2 is a diagram schematically showing the structure of a radio transmitter, at least one additional mixer, amplifier, filter, and loop may be required according to some embodiments.

Referring to FIG. 3, a receiver 300 includes an antenna (e.g., the antenna 121), an amplifier 310, a mixer 320, and an oscillator 330.

The structure of the receiver 300 is generally the same as that of the transmitter 200. The receiver 300 may be mounted on an Internet radio inaccessible vehicle 120.

The Internet radio inaccessible vehicle 120 receives electromagnetic waves radiated by the Internet radio accessible vehicle 110. The antenna 121 transforms electromagnetic waves into electric signals.

The Internet radio inaccessible vehicle 120 amplifies the received signal (not shown) using the amplifier 310. The Internet radio inaccessible vehicle 120 demodulates the amplified signal (not shown) using the mixer 320. In the demodulation process, a signal generated by the oscillator 330 may be used.

The Internet radio inaccessible vehicle 120 receives the demodulated signal, i.e., a baseband signal 340. Accordingly, occupants of the vehicle can listen to the original radio, which is the same signal as the Internet radio.

If the process executed in the transmitter 200 is reversed, it becomes a process executed in the receiver 300. Based on this principle, a vehicle can use a reception antenna as a transmission antenna when necessary.

One embodiment according to the present disclosure assumes a situation in which the Internet radio accessible vehicle 110 uses a reception antenna as a transmission antenna. For example, the antenna 111 of the Internet radio accessible vehicle 110 and the antenna 121 of the Internet radio inaccessible vehicle 120 are fundamentally the same antenna, differing only in whether the antenna converts the received electric signal into electromagnetic waves or converts the received electromagnetic waves into electric signals.

Figure 4:
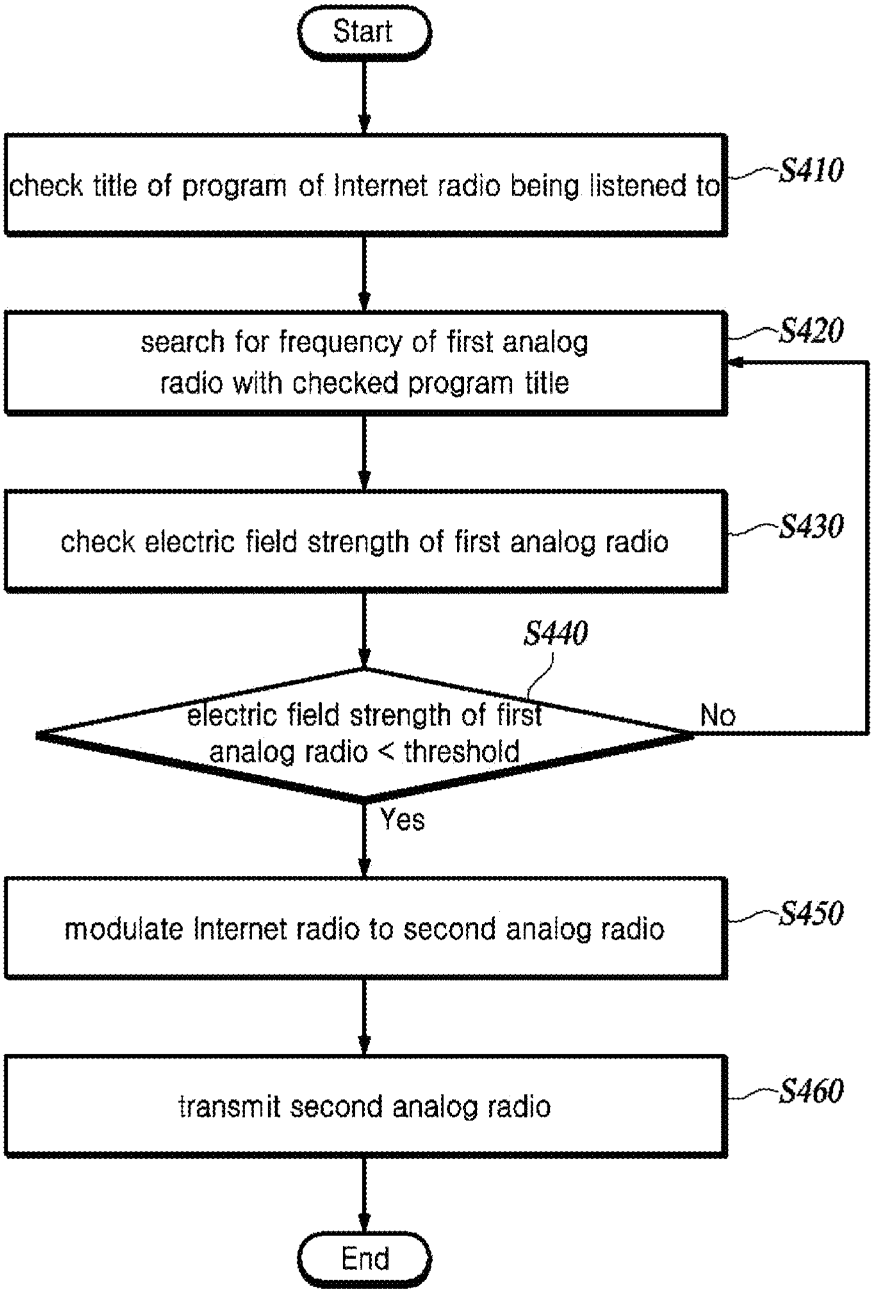
FIG. 4 is a flowchart illustrating a method for the Internet radio accessible vehicle to transmit analog radio according to one embodiment of the present disclosure.

FIG. 4 is a flowchart illustrating a method for the Internet radio accessible vehicle to transmit analog radio according to one embodiment of the present disclosure.

In an operation S410, a processor (not shown) checks a program title of program of the Internet radio being listened to.

In an operation S420, the processor searches for the frequency of a first analog radio with the same program title as the checked program title. The first analog radio is a radio broadcast transmitted by a radio station.

In an operation S430, the processor checks the electric field strength of the first analog radio at the searched frequency. In an example, dBμV may be used as a unit of the electric field strength.

In an operation S440, the processor determines whether the checked electric field strength of the first analog radio is less than a threshold. The threshold may be 20 dB μV.

When the electric field strength of the first analog radio is less than the threshold, the transmitter 200 modulates the Internet radio to a second analog radio in an operation S450. In an operation S460, the transmitter 200 transmits the second analog radio. The antenna 111 may be used in the transmission process of the second analog radio.

The Internet radio accessible vehicle 110 may use the reception antenna mounted on the vehicle as a transmission antenna. For example, the antenna 111 is a reception antenna, but can also be used as a transmission antenna.

According to one embodiment of the present disclosure, the transmitter 200 may transmit the second analog radio on the same frequency as the first analog radio. In this case, Internet radio may correspond to the baseband signal 210. The baseband signal 210 may be an electric signal. The second analog radio may correspond to electric signals in the modulation process in the operation S450, and may correspond to electromagnetic waves propagated in the air by the antenna 111 in the transmission process in the operation S460.

In other words, the Internet radio, first analog radio, and second analog radio are all expressed as 'radio', but it is noted that the form may be different depending on the process to which it belongs.

When the electric field strength of the first analog radio is equal to or greater than the threshold, the processor returns to the process of searching for the frequency of the first analog radio in the operation S420.

The process of FIG. 4 may be performed in the Internet radio accessible vehicle 110.

Figure 5:
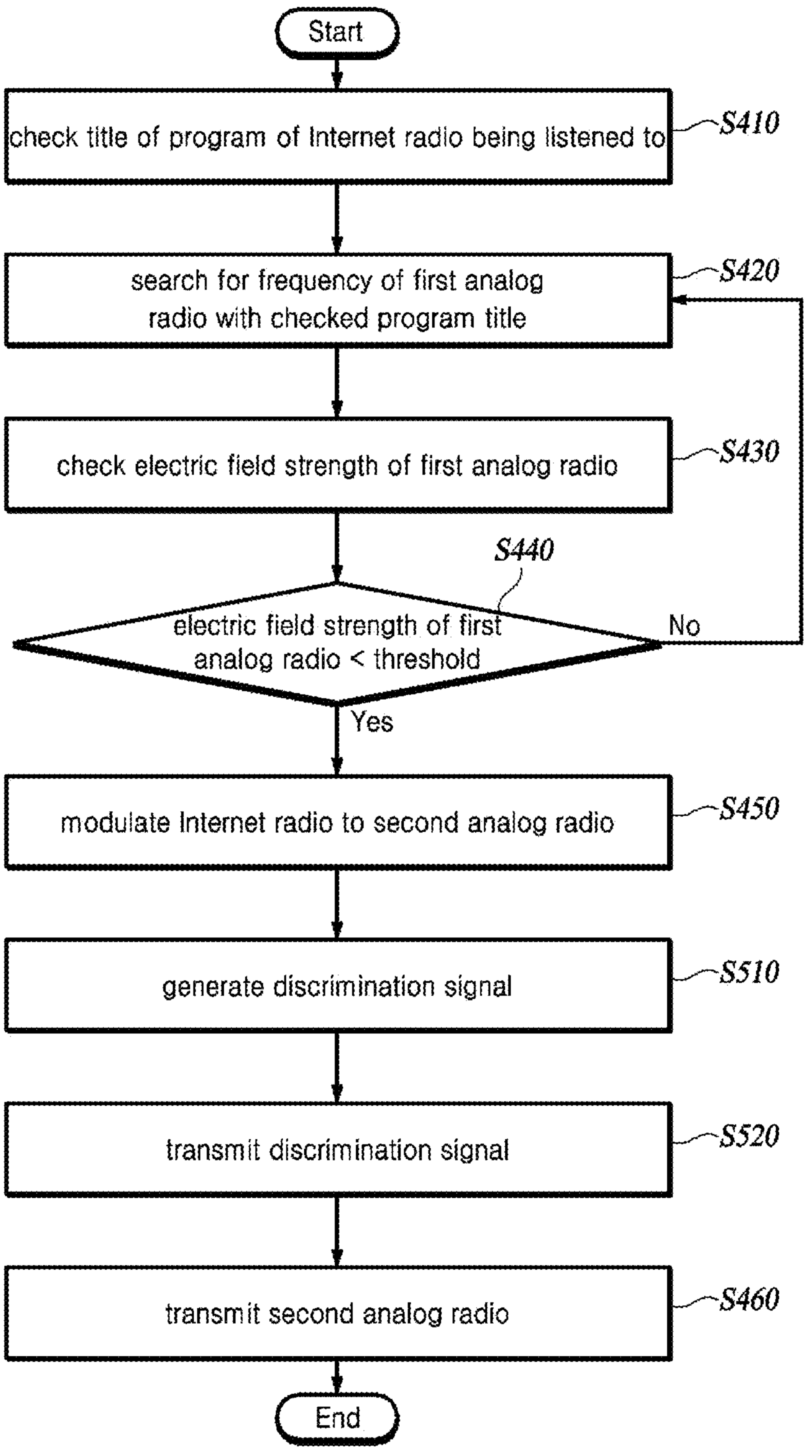
FIG. 5 is a flowchart illustrating a method for the Internet radio accessible vehicle to transmit a discrimination signal and analog radio according to one embodiment of the present disclosure.

FIG. 5 is a flowchart illustrating a method for the Internet radio accessible vehicle to transmit a discrimination signal and analog radio according to one embodiment of the present disclosure.

Compared to the method of FIG. 4, an operation S510 for performing a discrimination signal generation process and an operation S520 for performing a discrimination signal transmission process have been added.

In the operation 510, the processor generates a discrimination signal. The discrimination signal is a signal for distinguishing between the first analog radio transmitted by a radio station and the second analog radio transmitted by the Internet radio accessible vehicle 110, from the perspective of the Internet radio inaccessible vehicle 120. To generate the discrimination signal, at least one oscillator may be additionally used.

In the operation S520, the transmitter 200 transmits the discrimination signal. The antenna 111 may be used in the process of transmitting the discrimination signal.

According to one embodiment of the present disclosure, in the operation S520, the transmitter 200 may transmit the discrimination signal on the same frequency as the frequency of the first analog radio. In this case, the transmitter 200 may transmit the second analog radio on a frequency different from the frequency of the first analog radio in the operation S460.

The frequency that is different from the frequency of the first analog radio may be different from the frequency of the first analog radio by 100 kHz. For example, when the first analog radio is transmitting at the 89.1 MHz frequency band, the transmitter 200 may transmit the discrimination signal at 89.1 MHz and transmit the second analog radio at 89.2 MHz.

This method may prevent interference with the signal transmitted by the radio station by transmitting the second analog radio using a different frequency from the first analog radio, in at least some embodiments. In other words, the added/modified processes in the method of FIG. 5 compared to the method of FIG. 4 may prevent interference between the signal transmitted by the radio station and the signal transmitted by a surrounding vehicle in the receiving vehicle.

In FIG. 5, the discrimination signal generation process in the operation S510 and the discrimination signal transmission process in the operation S520 are arranged after the process of modulating the Internet radio to the second analog radio in the operation S450 and before the process of transmitting the second analog radio in the operation S460. However, the present disclosure is not limited to the set order. For example, the discrimination signal generation process in the operation S510 and the discrimination signal transmission process in the operation S520 may be performed simultaneously with the second analog radio modulation process in the operation S450 and the second analog radio transmission process in the operation S460.

The process of FIG. 5 may be performed in the Internet radio accessible vehicle 110.

Figure 6:
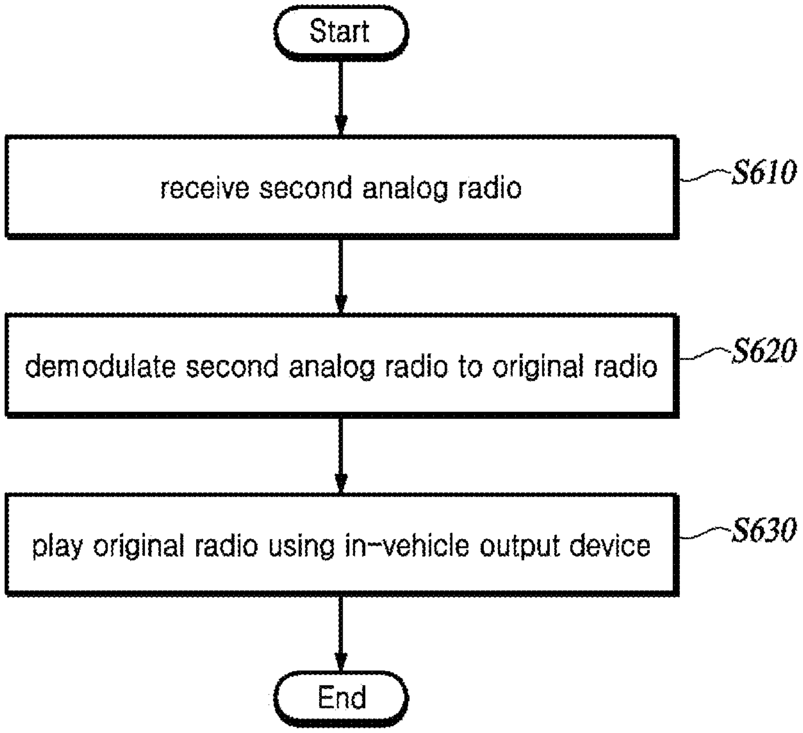
FIG. 6 is a flowchart illustrating a method for the Internet radio inaccessible vehicle to receive analog radio from the Internet radio accessible vehicle, according to one embodiment of the present disclosure.

FIG. 6 is a flowchart illustrating a method for the Internet radio inaccessible vehicle to receive analog radio from the Internet radio accessible vehicle, according to one embodiment of the present disclosure.

In an operation S610, the receiver 300 receives the second analog radio. The antenna 121 may be used in the reception process of the second analog radio.

The second analog radio may be a signal generated by the Internet radio accessible vehicle 110. The Internet radio accessible vehicle 110 and the Internet radio inaccessible vehicle 120 may be adjacent to each other.

According to one embodiment of the present disclosure, the receiver 300 may receive the second analog radio on the same frequency as the first analog radio.

In an operation S620, the receiver 300 demodulates the second analog radio to the original radio.

The original radio may be the same signal as the Internet radio. This is because the original radio is the result of the Internet radio inaccessible vehicle 120 receiving modulated Internet radio from the Internet radio accessible vehicle 110 and demodulating it. In this case, the original radio may correspond to the baseband signal 340. The baseband signal 340 may be an electric signal. The second analog radio may correspond to electromagnetic waves received by the antenna 121 in the reception process in the operation S610 and may correspond to electric signals in the demodulation process in the operation S620. Accordingly, the baseband signal 340 corresponding to the original radio may be the same signal as the baseband signal 210 corresponding to the Internet radio.

In an operation S630, a processor (not shown) plays the original radio using an in-vehicle output device. The in-vehicle output device may be a speaker, a wired/wireless headset, and earphones.

The process of FIG. 6 may be performed in the Internet radio inaccessible vehicle 120.

The process of FIG. 6 may be performed after the process of FIG. 4 or FIG. 5 has been performed, but the present disclosure is not limited thereto.

Figure 7:
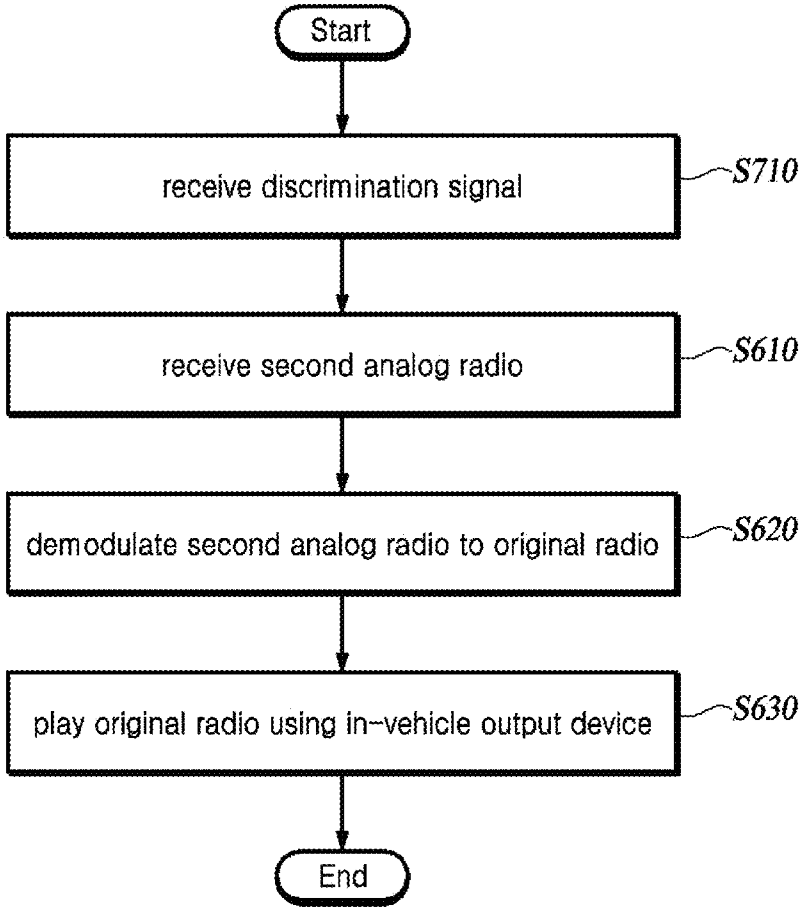
FIG. 7 is a flowchart illustrating a method for the Internet radio inaccessible vehicle to receive a discrimination signal and analog radio from the Internet radio accessible vehicle, according to one embodiment of the present disclosure.

FIG. 7 is a flowchart illustrating a method for the Internet radio inaccessible vehicle to receive a discrimination signal and analog radio from the Internet radio accessible vehicle, according to one embodiment of the present disclosure.

Compared to the method of FIG. 6, an operation S710 for performing a discrimination signal reception process has been added.

In the operation S710, the receiver 300 receives the discrimination signal. The antenna 121 may be used in the process of receiving the discrimination signal.

The discrimination signal may be a signal generated by the Internet radio accessible vehicle 110. The Internet radio accessible vehicle 110 and the Internet radio inaccessible vehicle 120 may be adjacent to each other.

According to one embodiment of the present disclosure, in the operation S710, the receiver 300 may receive the discrimination signal on the same frequency as the frequency of the first analog radio. In this case, the receiver 300 may receive the second analog radio on a frequency different from the frequency of the first analog radio in the operation S610.

The frequency that is different from the frequency of the first analog radio may be different from the frequency of the first analog radio by 100 kHz. For example, when the first analog radio is transmitted at the 89.1 MHz frequency band, the receiver 300 may receive the discrimination signal at 89.1 MHz and the second analog radio at 89.2 MHz.

This method may prevent interference with the signal transmitted by the radio station by receiving the second analog radio using a different frequency from the first analog radio, in at least some embodiments. In other words, the added/modified process in the method of FIG. 7 compared to the method of FIG. 6 may prevent interference between the signal transmitted by the radio station and the signal transmitted by a surrounding vehicle in the receiving vehicle. The surrounding vehicle may be the Internet radio accessible vehicle 110.

In FIG. 7, the discrimination signal reception process in the operation S710 is arranged before the second analog radio reception process in the operation S610. However, the present disclosure is not limited to this order. For example, the discrimination signal reception process in the operation S710 may be executed simultaneously with the second analog radio reception process in the operation S610.

The process of FIG. 7 may be performed in the Internet radio inaccessible vehicle 120.

The process of FIG. 7 may be performed after the entire process of FIG. 4 or FIG. 5 has been performed, but the present disclosure is not limited thereto.

Figure 8:
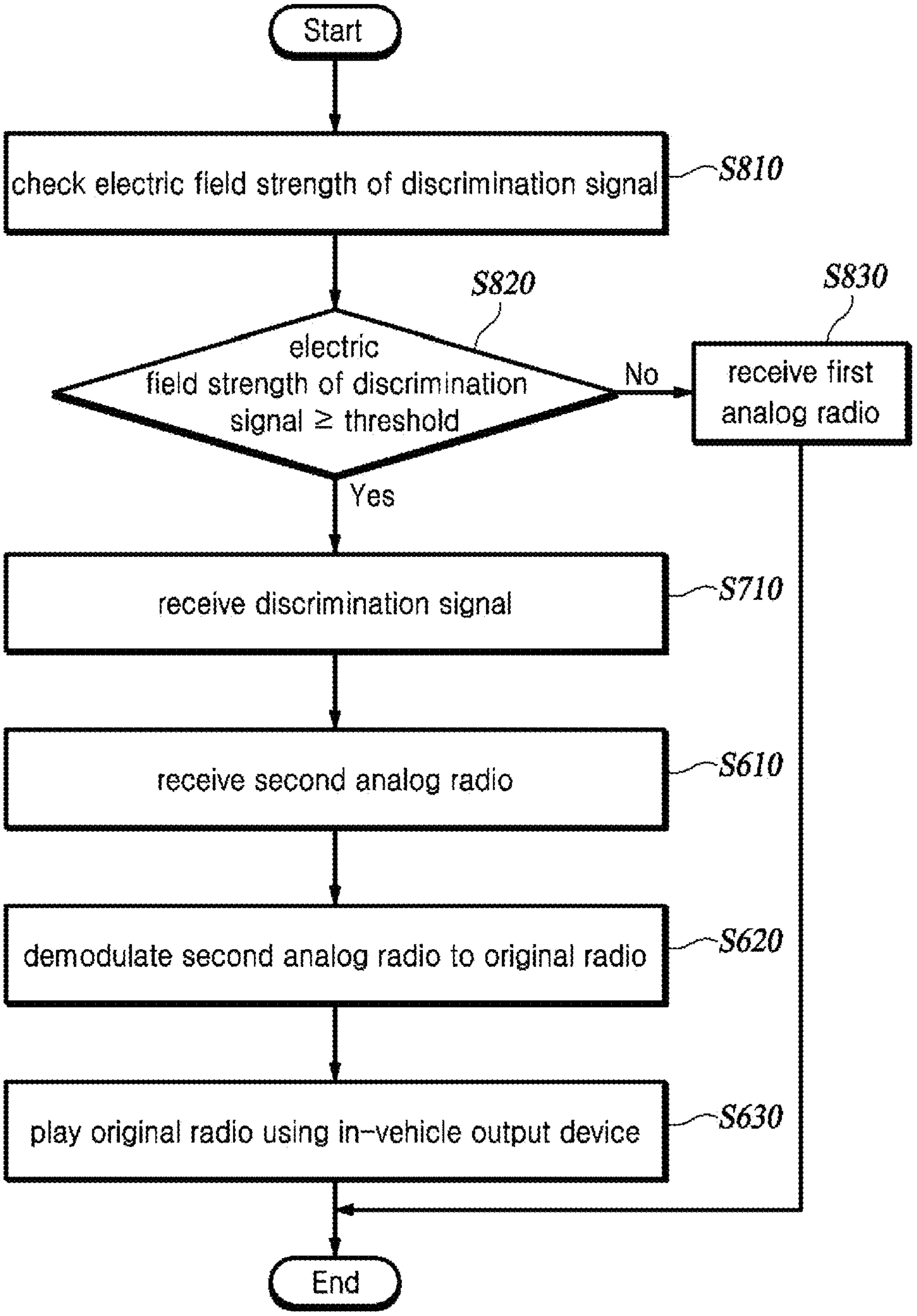
FIG. 8 is a flow chart illustrating a method for the Internet radio inaccessible vehicle to receive a discrimination signal and analog radio from the Internet radio accessible vehicle, and a method for the Internet radio inaccessible vehicle to receive neither of the two from the Internet radio accessible vehicle, according to one embodiment of the present disclosure.

FIG. 8 is a flow chart illustrating a method for the Internet radio inaccessible vehicle to receive a discrimination signal and analog radio from the Internet radio accessible vehicle, and a method for the Internet radio inaccessible vehicle to receive neither of the two from the Internet radio accessible vehicle, according to one embodiment of the present disclosure.

In an operation S810, the processor checks the electric field strength of the discrimination signal at the same frequency as the frequency of the first analog radio. dBμV may be used as a unit of electric field strength.

In an operation S820, the processor determines whether the electric field strength of the checked discrimination signal is less than a threshold.

When the electric field strength of the discrimination signal is greater than the threshold, the same process as in FIG. 7 is performed. Accordingly, the receiver 300 receives the discrimination signal on the same frequency as the frequency of the first analog radio in the operation S710, receives the second analog radio on a frequency different from the frequency of the first analog radio in the operation S610, and demodulates the second analog radio to the original radio in the operation S620, and the processor (not shown) plays the original radio using the in-vehicle output device in the operation S630.

Accordingly, in an embodiment, the Internet radio inaccessible vehicle 120 receives the discrimination signal and the second analog radio transmitted by the Internet radio accessible vehicle 110.

When the electric field strength of the discrimination signal is less than the threshold, the Internet radio inaccessible vehicle 120 receives the first analog radio on the same frequency as that of the first analog radio in an operation S830. In other words, when the electric field strength of the discrimination signal is less than the threshold, the processor (not shown) determines that there is no Internet radio accessible vehicle 110 in the neighborhood that transmits the discrimination signal and the second analog radio, and attempts to receive the first analog radio broadcasted by the radio station.

Accordingly, in an embodiment, the Internet radio inaccessible vehicle 120 receives neither the discrimination signal nor the second analog radio transmitted by the Internet radio accessible vehicle 110.

The process of FIG. 8 may be performed in the Internet radio inaccessible vehicle 120.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of controlling a vehicle radio apparatus, the method comprising:

checking a program title of a program of Internet radio being listened to;

searching for a frequency of a first analog radio with the program title, the first analog radio being a radio broadcast transmitted by a radio station;

checking an electric field strength of the first analog radio at the frequency;

modulating the Internet radio to a second analog radio when the electric field strength is less than a threshold; and transmitting the second analog radio.

2. The method of claim 1, further comprising re-searching the frequency of the first analog radio with the program title when the electric field strength is equal to or greater than the threshold.

3. The method of claim 1, wherein transmitting the second analog radio includes transmitting the second analog radio on a same frequency as the frequency of the first analog radio.

4. The method of claim 1, further comprising:

generating a discrimination signal to distinguish the second analog radio from the first analog radio; and transmitting the discrimination signal.

5. The method of claim 4, wherein transmitting the discrimination signal includes transmitting the discrimination signal on a same frequency as the frequency of the first analog radio, and wherein transmitting the second analog radio includes transmitting the second analog radio on a frequency different from the frequency of the first analog radio.

6. A method of controlling a vehicle radio apparatus, the method comprising:

receiving a second analog radio;

demodulating the second analog radio to an original radio; and playing the original radio using an in-vehicle output device, wherein the second analog radio is a signal generated by a surrounding vehicle by checking a program title of a program of Internet radio being listened to, searching for a frequency of a first analog radio with the program title, the first analog radio being a radio broadcast transmitted by a radio station, checking an electric field strength of the first analog radio at the frequency, and modulating the Internet radio to the second analog radio when the electric field strength is less than a threshold, wherein the original radio is the same signal as the Internet radio.

7. The method of claim 6, wherein receiving the second analog radio includes receiving the second analog radio on a same frequency as the frequency of the first analog radio.

8. The method of claim 6, further comprising receiving a discrimination signal to distinguish the second analog radio from the first analog radio.

9. The method of claim 8, wherein receiving the discrimination signal includes receiving the discrimination signal on the same frequency as the frequency of the first analog radio, and wherein receiving the second analog radio includes receiving the second analog radio on a frequency different from the frequency of the first analog radio.

10. A vehicle radio apparatus comprising:

a transmitter configured to receive a radio signal, modulate the radio signal, and transmit the modulated radio signal;

at least one memory storing instructions; and at least one processor configured to process signals relating to Internet radio and analog radio, wherein the at least one processor is configured to executes the instructions to check a program title of a program of Internet radio being listened to, search for a frequency of a first analog radio with the program title, the first analog radio being a radio broadcast transmitted by a radio station, and check an electric field strength of first the analog radio at the frequency, wherein the transmitter is configured to modulate the Internet radio to a second analog radio when the electric field strength is less than a threshold, and transmit the second analog radio.

11. The vehicle radio apparatus of claim 10, wherein the processor is configured to research the frequency of the first analog radio with the program title when the electric field strength is equal to or greater than the threshold.

12. The vehicle radio apparatus of claim 10, wherein the transmitter is configured to transmit the second analog radio on a same frequency as the frequency of the first analog radio.

13. The vehicle radio apparatus of claim 10, wherein:

the processor is further configured to generate a discrimination signal to distinguish the second analog radio from the first analog radio; and the transmitter is further configured to transmit the discrimination signal.

14. The vehicle radio apparatus of claim 13, wherein the transmitter is configured to:

transmits the discrimination signal on a same frequency as the frequency of the first analog radio; and transmit the second analog radio on a frequency different from the frequency of the first analog radio.

* * * * *